Patented May 9, 1950

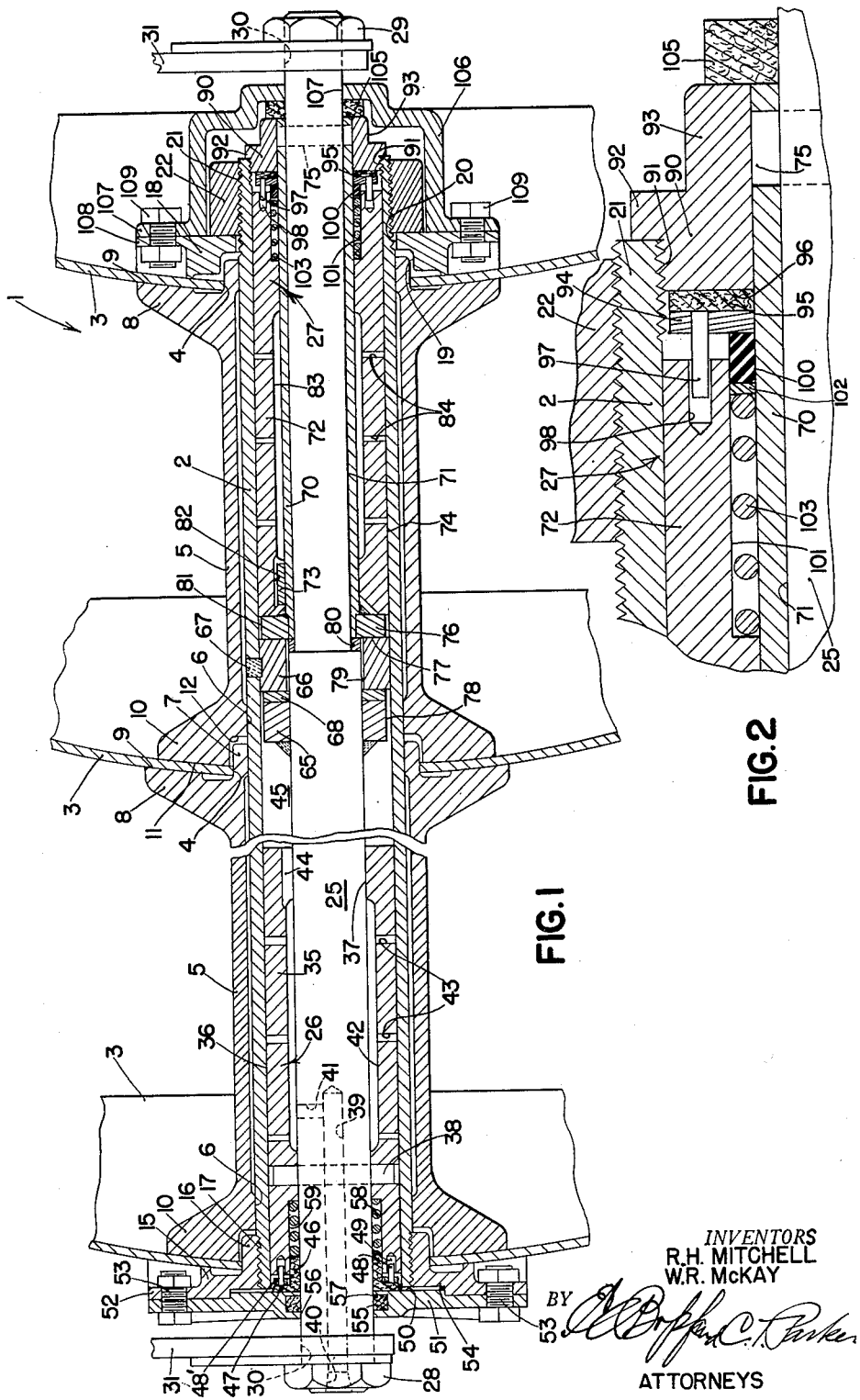

2,506,807

UNITED STATES PATENT OFFICE 2,506,807

DISK HARROW

Rollie H. Mitchell, Huntington Park, and William R. McKay, Compton, Calif., assignors to John Deere Killefer Company, a corporation of California Application March 30, 1944, Serial No. 528,797

11 Claims. (Cl. 308—19)

The present invention relates generally to disk harrows and more particularly to disk harrows of the type in which the disks are mounted on a tubular support which is mounted on totally enclosed bearings on a stationary axle rigidly carried by the gang frame, the tubular support serving as an enclosure for lubricant for the bearings mounted therein. The principal object of the present invention relates to the provision of a tubular bearing construction of novel and improved design which more effectively retains the lubricant and excludes dust and dirt and is therefore more durable and requires less frequent attention.

Another object of the present invention has to do with a disk harrow tubular bearing construction of improved accessibility, providing for removal and disassembly of the axle and bearings without disturbing the disks mounted on the tubular member, and also permits disassembly of the disks from the tubular member without disturbing the bearing assemblies or the sealing means.

These and other objects and advantages of our invention will be apparent to those skilled in the art after a consideration of the following description, in which reference is had to the drawings appended hereto, in which Figure 1 is a sectional elevational view taken in section along an axial plane of a disk harrow gang having tubular bearings embodying the principles of the present invention.

Figure 2 is an enlarged portion of Figure 1 showing the details of the sealing means at the right end of the gang as viewed in Figure 1.

The disk gang, indicated in its entirety by reference numeral 1, comprises a cylindrical supporting tube 2, upon which are mounted a plurality of axially spaced concavo-convex disks 3. Each of the disks 3 is provided, as is well-known to those skilled in the art, with a central aperture 4 of non-circular conformation, preferably square, and appreciably larger than the outer periphery of the tube 2. The disks 3 are rigidly mounted on the tube 2 in axially spaced relation, by means of spacing spools 5, each of which is provided with a central aperture 6 adapted to slidably receive the tube 2, and has at one end a disk mounting portion 7 of square periphery adapted to receive the square aperture 4 of one of the disks 3 to prevent rotation of the disk relative to the spool. A radially extending flange portion 8 disposed adjacent the supporting portion 7, is provided with a concave surface 9 against which the convex surface of the associated disk 3 lies in abutment. Each of the spools 5 is provided at its opposite end with a radially extending flange portion 10 having a convex end face 11 adapted to fit against the concave surface of the adjacent disk to secure the latter rigidly against the flange 8 of the adjacent spool. A square recess 12 is provided in the end of each spool to receive the square disk mounting portion 7 of the adjacent spool in interlocked relation.

The disk at one end of the assembly is mounted on an end bracket 15 having a disk mounting portion 16 which is internally threaded at 17 to receive the end of the tube 2, the latter being also threaded to cooperate with the bracket threads. The disk mounting portion 16 is provided with a square outer periphery to slidably receive the central aperture 4 of the end disk 3. The end disk at the opposite end of the gang is secured against the concave surface 9 of the adjacent spool 5 by means of a clamping ring 18, adapted to bear against the concave surface of the disk and having a central recessed portion 19 of square cross section adapted to receive the disk mounting portion 7 of the adjacent spool. The clamping ring 18 is also provided with a central aperture 20 adapted to slidably receive the tube 2 for centering the ring 18 on the axis of the tube. This end of the tube 2 is threaded at 21 to receive a clamping nut 22, which can be drawn up tightly against the clamping ring 18 and secure the disks and spools in tightly clamped relation between the nut 22 at one end of the tube 2 and the end bracket 15 at the opposite end of the tube.

The tube 2 is rotatably supported on an axle 25 by means of a pair of journal bearings disposed within opposite ends of the tube 2 and indicated in their entirety by reference numeral 26, 27, respectively. The axle 25 comprises a solid bolt having a nut 28 at one end thereof and a nut 29 on the opposite end, which is suitably threaded to receive the nut. The bolt 25 is adapted to be inserted through suitable bolt-receiving apertures 30 in the end members 31 of the gang frame and is rigid with respect to the latter.

The bearing 26 at one end of the gang comprises a bearing sleeve 35 having a cylindrical outer bearing surface 36 on which the tube 2 is journaled. The interior aperture 37 in the sleeve 35 is adapted to slidably fit over the axle bolt 25, and the sleeve is secured to the axle 25 by means of a pin 38, which extends through radially aligned apertures in the axle 25 and sleeve 35, respectively, preventing relative rotation and relative axial movement of the sleeve 35 relative to the axle.

Lubricant is supplied to the bearing 26 through an axially drilled passage 39 extending inwardly from the head of the bolt 25. A suitable lubricant fitting (not shown) can be threaded into a tapped opening 40 in the head 28. A radially extending lubricant passage 41 connects the passage 39 with an enlarged portion 42 within the interior of the bearing sleeve 35, serving as a lubricant passage around the bolt 25. A plurality of radially extending passages 43 connect the passage 42 with the bearing surface 36. An axially extending groove 44 connects the passage 42 in communication with the hollow interior 45 of the tube 2, which serves as a reservoir for the lubricant. The lubricant is retained within the bearing sleeve and reservoir 45 by means of a resilient annular sealing means, preferably in the form of a leather sealing ring 46 having a cylindrical flange portion closely embracing the bolt 25 at the outer end of the sleeve 35, and disposed within an annular recess 59 in the end of the sleeve 35 around the bolt 25. The leather seal 46 is provided with a radially extending flange 47, which extends outwardly around the end of the sleeve 35 and is held stationary by means of dowels 48 fixed to a steel washer 48' cemented to the back of the flange 47 and extending into dowel sockets 49 in the end of the sleeve 35. The outer or wiping surface of the flange 47 of the leather seal 46 is disposed in sliding or wiping contact with the inner face 50 of a cap or collar 51, which is mounted on the bolt 25 and is rigidly connected to an outwardly extending flange portion 52 of the end bracket 15, by means of bolts 53. The end cap 51 is centered by means of a circular recess 54 in the outer surface of the bracket 15, within which the cap 51 extends. The cap 51 is provided with an annular recess 55 extending around the interior surface of the axle-receiving aperture 56. An annular felt washer 57 reposes within the recess 55 and embraces the bolt 25 and serves to exclude dust and dirt as a protection for the leather seal 46. During operation, the axle 25, bearing sleeve 35, and leather seal 46, are held stationary, while the tube 2, end bracket 15, and cap 51, rotate about the axis of the bolt 25. The seal member 46 is maintained in sliding contact with the inner face of the cap 51 by means of a helical spring 58 encircling the gang bolt 25 within the recess 59 in the end of the sleeve 35. The spring 58 bears against the edge of the seal 46, which transmits the force of the spring to the wiping flange portion 47 and coincidentally deforms the seal within the recess 59 causing it to expand between the axle 25 and sleeve 35. Thus, it is evident that the leather seal 46 serves to prevent leakage of the lubricant outwardly between the sleeve 35 and bolt 25 and also from the bearing surfaces around the end of the sleeve 35. The leather seal also prevents entry of dust and grit, and is assisted by the felt seal 57 in the recess 55.

During operation in the field, the disk gang is propelled with the concave sides of the disk facing slightly forwardly, the axis of the gang being disposed at an acute angle to the direction of travel. As is well-known to those skilled in the art, the action of the dirt against the concave surfaces of the disks exerts an axial thrust upon the latter, tending to force them toward the left as viewed in the drawing. This thrust is resisted by a thrust bearing comprising a ring 65 embracing the gang bolt 25 and rigidly welded thereto, a second ring 66 fitting closely within the tube 2 and rigidly welded to the latter by spot welding through apertures in the tube, as indicated at 67, and a steel bearing washer 68 encircling the gang bolt 25 between the two rings 65, 66. Thus, it is evident that a thrust force acting toward the left upon the disks 3 is transmitted through the tube 2, thrust rings 66, 65, to the axle 25.

The bearing 27 at the right end of the axle 25 comprises a sleeve 70, which fits slidably but snugly over a portion 71 of the axle 25 which has been turned to a smaller diameter, defining therebetween a shoulder. Mounted on the sleeve 70 is a bearing bushing or sleeve 72, which is keyed to the sleeve 70 by means of a key 73, which prevents relative rotation between the two sleeves 70, 72. The cylindrical outer surface 74 of the bearing sleeve 72 forms the bearing on which the right end of the tube 2 is journaled. The inner sleeve 70 is secured against rotation and against axial movement along the reduced portion 71 of the axle, by means of a pin 75, which extends through aligned apertures in the sleeve 70 and the axle portion 71, respectively. A thrust ring 76 is welded to the inner end of the inner sleeve 70 and has a thrust surface 77 which bears against the right side of the thrust ring 66 on the tube 2. While the ring 76 does not take any thrust load during normal operation, there are occasions during transport and under some conditions during turning of the harrow when the thrust is in the opposite direction to the normal thrust, which occasional thrust is transmitted through the rings 66, 76 to the sleeve 70 and thence to the axle through the pin 75.

The thrust surface 77 is lubricated by lubricant from the reservoir 45, which passes through a small clearance space 78 between the outer periphery of the thrust ring 65 and the inner surface of the tube 2, between the thrust rings 65, 66 on both sides of the bearing washer 68 and then through a clearance space 79 between the axle 25 and the thrust ring 66. An annular sealing ring 80 of any suitable resilient material such as neoprene or the like, lies against the shoulder at the end of the reduced portion 71 and prevents the lubricant from flowing inwardly between the axle and the sleeve 70, thereby insuring that the lubricant flows outwardly along the thrust surface 77 and through a clearance space 81 between the ring 76 and the tube 2. The lubricant then flows in between the bearing surface 74 and the tube and also flows inwardly around the end of the bearing bushing 72, through a passage 82 along the key 73, into a clearance passage 83 between the two sleeves 70, 72, and which serves as a reservoir for the lubricant. A plurality of radial passages 84 conducts the lubricant from the reservoir space 83 to various points on the bearing surface 74.

The right end of the tube 2 is closed by means of a closure collar 90, which closely but slidably embraces the end of the inner sleeve 72 and has an outer cylindrical surface which is threaded to engage internal threads 91 within the end of the tube 2. A flange 92 extends radially on the outer surface of the collar 90 and engages the end of the tube 2 but is of a smaller diameter than the outer diameter of the tube, to permit removal of the nut 22 from the threads 21 without disturbing the collar 90. The collar 90 also has a noncircular portion 93, preferably of hexagonal or square cross section, adapted to receive a wrench for tightening the collar 90 into the threads 91. The last-named portion 93 of the collar 90 lies over the pin 75 and prevents it from dropping out of the apertures in the axle and inner sleeve 70.

Lubricant is prevented from running out of the end of the bearing surface 74 by means of an annular seal 95 of resilient material such as leather, encircling the sleeve 70 between the bearing bushing 72 and the inner face 96 of the collar 90. The annular sealing member 95 is held against rotation by means of dowel pins 97, which are inserted within dowel sockets 98 in the end of the bearing bushing 72 and are welded to a steel washer 94 attached to said seal 95, as by cementing.

Lubricant is prevented from flowing axially outwardly between the sleeves 70, 72 by means of an annular sealing member 100, which is disposed within an annular recess 101 in the end of the bushing 72, between the latter and the sleeve 70. The annular sealing member 100 is made of suitable deformable resilient material, preferably of neoprene, and is backed by a steel washer 102. A helical spring 103 encircles the sleeve 70 within the recess 101 and urges the annular sealing member 100 outwardly toward the right, bearing against the washer 94 to force the leather sealing member 95 into sliding or wiping contact with the inner face 96 of the collar 90, as the latter turns with the tube 2 during operation. Coincidentally, the spring 103 deforms the sealing member 100 by expanding the latter outwardly into firm engagement with the bearing member 72 and sleeve 70 to close the recess 101. The annular sealing members 95, 100 not only retain the lubricant within the bearing, but also exclude dirt, dust and grit which might otherwise pass between the closure collar 90 and the sleeve 70.

A felt washer 105 aids in excluding dust, and comprises an annular sealing member which closely embraces the axle 25 between the outer end of the collar 90 and sleeve 70, and is retained in sliding contact with the collar by means of a dust cap 106 having a central aperture 107 adapted to closely encircle the axle, and a cup-shaped body enclosing the end of the tube, the collar 90, and the nut 22, and has a radially outwardly extending flange 107, which lies flat against a corresponding flange 108 on the clamping ring 18 and is secured to the latter by bolts 109.

We have found that the bearing construction shown and described herein is very effective in operation and is well protected against influx of dirt and grit and is therefore inherently long lived.

It will be noted that the disks 3 can easily be disassembled without disturbing the bearings by first removing the nut 29 and dismounting the axle bolt 25 from the frame 31. The bolts 109 are then removed, permitting removal of the dust cap 106, after which the nut 22 can be unscrewed and removed, releasing the clamping ring 18 and permitting the latter, the disks 3, and the spools 5 to be slipped off the end of the tube 2.

On the other hand, if it is desired to disassemble the bearings and remove the axle, the disks and spools can be left undisturbed, as the collar 90 is unscrewed from the end of the tube 2, exposing the pin 75, which can be slipped out of the aperture in the axle, after which the inner sleeve 70 can be slid off the end of the axle 25, carrying with it the bearing sleeve 72 and the sealing devices 95, 100. After removing the cap 51 on the other end of the tube 2, the entire axle can then be pulled out of the left end of the tube, together with the bearing sleeve 35.

We claim:

1. In a tubular bearing construction including a relatively stationary axle having a cylindrical bearing member fixed thereto, and a disk-supporting tube having disks mounted thereon and removable from one end of said tube, the latter embracing said axle and having said one end bearing upon the periphery of said bearing member, the combination therewith of lubricant seal means comprising a collar having an outer diameter less than the outer diameter of said tube and being threaded into said one end of said tube and embracing said axle to serve as a closure for said tube while permitting removal and assembly of disks on said tube without disturbing said collar, said bearing member having an annular recess in the end adjacent said collar, resilient annular sealing means encircling said axle and disposed within said recess in stationary relation to said bearing member and in sliding contact with an adjacent radial face on said collar to form a lubricant retaining enclosure between said tube and said axle, and a dust cap detachably connected with said one end of said tube, being removable therefrom to accommodate removal of said disks from said tube, and enclosing said end of said tube, said collar and said annular sealing means.

2. The combination set forth in claim 1, including the further provision of an additional annular resilient sealing means encircling said axle and disposed in compression between said dust cap and said collar.

3. For use in a tubular bearing construction which includes an axle having a cylindrical bearing member, a tube embracing said axle and journaled on said bearing member, and a collar member fixed to the end of said tube serving as a closure therefor outside said bearing member and embracing said axle, said members having axially spaced radial faces, the improvement comprising a lubricant seal acting between said tube and axle and including resilient annular sealing means encircling said axle between the adjacent radial faces of said members and attached to one of the latter, and a helical spring encircling said axle between said sealing means and said one member and urging said sealing means into sliding contact with the other of said members to form a lubricant retaining enclosure between said tube and said axle.

4. For use in a tubular bearing construction which includes an axle having a cylindrical bearing member, a tube embracing said axle and journaled on said bearing member, and a collar member fixed to the end of said tube serving as a closure therefor outside said bearing member and embracing said axle, said members having axially spaced radial faces, one of said members having an annular recess in the radial face adjacent the other member, the improvement comprising a lubricant seal acting between said tube and axle and including resilient annular sealing means encircling said axle and disposed within said recess in sliding contact with the adjacent radial face of said other member, and a helical spring encircling said axle within said recess and urging said sealing means into said sliding contact with the other member to form a lubricant retaining enclosure between said tube and said axle.

5. For use in a tubular bearing construction which includes an axle having a cylindrical bearing member, a tube embracing said bearing member, and a collar fixed to the end of said tube serving as a closure therefor outside said bearing member and embracing said axle and having a radial face adjacent said member, said bearing member having an annular recess in the end adjacent said collar, the improvement comprising a lubricant seal acting between said tube and axle and including resilient annular sealing means encircling said axle and disposed within said recess in stationary relation to said bearing member, and a helical spring encircling said axle within said recess behind said sealing means and urging the latter into sliding contact with the adjacent radial face of said collar to form a lubricant retaining enclosure between said tube and said axle.

6. For use in a tubular bearing construction of the type including an axle, a sleeve mounted thereon and fixed thereto, and a disk-supporting tube embracing said axle and sleeve, the improvement comprising a bearing bushing mounted on and embracing said sleeve and keyed to the latter, a collar removably threaded into the end of said tube and serving as a closure therefor, said bearing bushing being recessed within the end adjacent said collar to provide a space between said bushing and said sleeve, a sealing member disposed about said sleeve adjacent the recessed end of said bearing bushing, means carried by the latter for urging said sealing member into engagement with said collar, a seal acting between said sleeve and the recessed portion of said bearing member, and a helical compression spring encircling said sleeve within said recess and adapted to bear against said last mentioned seal and through the latter against said sealing means to urge the latter into sliding contact with the adjacent end face of said collar.

7. For use in a bearing construction including an axle, a bearing member rigidly mounted on said axle, a tube embracing said bearing member, and a collar fixed to the end of said tube serving as a closure therefor outside said bearing member and embracing said axle, the improvement comprising a lubricant seal construction including an annular recess in the end of said bearing member adjacent said collar, resilient annular sealing means encircling said axle and disposed within said recess in stationary relation to said bearing member, means for urging said resilient means into lubricant retaining and dust excluding contact with said axle and said bearing member, and a sealing member engaged by said annular sealing means and urged thereby into sealing engagement with said collar.

8. The invention set forth in claim 7, including the further provisions that said sealing member includes a wiping surface in sliding contact with the inner end surface of said collar and said annular sealing means includes a deformable portion disposed within said recess, and that said urging means is adapted to apply an axially directed force through said deformable portion to urge said wiping surface into said sliding contact and coincidentally deform said deformable portion into firm engagement with opposite sides of said recess.

9. The invention set forth in claim 7, including the further provisions that said sealing member includes a leather sealing ring in sliding contact with the inner end surface of said collar and said annular sealing means includes a rubber-like ring disposed within said recess between said bearing member and said axle, and that said urging means comprises a spring adapted to apply an axially directed force through said rubber-like ring to urge said wiping surface into said sliding contact and coincidentally deform said rubber-like ring to close said recess.

10. For use in a bearing construction including an axle, a bearing member rigidly mounted on said axle, a tube embracing said bearing member, and a collar fixed to the end of said tube serving as a closure therefor outside said bearing member and embracing said axle, the improvement including a lubricant seal construction comprising an annular recess in the end of said bearing member adjacent said collar, resilient annular sealing means comprising a leather ring having a radially extending flange in sliding contact with the inner end surface of said closure member and a cylindrical flange disposed within said recess between said bearing member and said axle, a spring within said recess adapted to apply an axially directed force through said cylindrical flange to urge said radial flange into said sliding contact and coincidentally deform said cylindrical flange to firmly close said recess.

11. For use in a tubular bearing construction which includes an axle having a shoulder, a sleeve on said axle, a disk-supporting tube, and a collar fixed to the end of said tube, the improvement comprising a resilient annular sealing means disposed between the inner end of said sleeve and said shoulder, means fixing said sleeve on said axle with said sealing means engaged therebetween to prevent leakage of lubricant under said sleeve, a cylindrical bearing member adapted to be detachably fixed on said sleeve and rotatably receiving said supporting tube, and sealing means acting between the outer end of said bearing member and the inner face of said collar.

ROLLIE H. MITCHELL.
WILLIAM R. McKAY.

REFERENCES CITED

The following references are of record in the file of this patent:

UNITED STATES PATENTS

| Number | Name | Date |
| --- | --- | --- |
| 1,851,075 | Ackerman | Mar. 29, 1932 |
| 2,020,545 | Goble | Nov. 12, 1935 |
| 2,091,485 | Panzegrau | Aug. 31, 1937 |
| 2,135,192 | Mitchell et al. | Nov. 1, 1938 |
| 2,199,761 | Shenton | May 7, 1940 |
| 2,272,100 | Thomas et al. | Feb. 3, 1942 |
| 2,355,390 | Murphy | Aug. 8, 1944 |